US012802224B2

(12) United States Patent
Zhu et al.

(10) Patent No.: US 12,802,224 B2
(45) Date of Patent: Nov. 17, 2026

(54) GENERAL-PURPOSE CROSSTALK CORRECTION METHOD FOR MOSAIC MULTISPECTRAL IMAGING CROP GROWTH SENSING DEVICES

(71) Applicant: SANYA INSTITUTE OF NANJING AGRICULTURAL UNIVERSITY, Sanya (CN)

(72) Inventors: Yan Zhu, Sanya (CN); Yongxian Wang, Sanya (CN); Dong Zhou, Sanya (CN); Weixing Cao, Sanya (CN); Xia Yao, Sanya (CN); Yu Zhang, Sanya (CN)

(73) Assignee: SANYA INSTITUTE OF NANJING AGRICULTURAL UNIVERSITY, Sanya (CN)

( * ) Notice: Subject to any disclaimer, the term of this patent is extended or adjusted under 35 U.S.C. 154(b) by 0 days.

(21) Appl. No.: 19/278,389

(22) Filed: Jul. 23, 2025

(65) Prior Publication Data

US 2026/0030750 A1 Jan. 29, 2026

(30) Foreign Application Priority Data

Jul. 29, 2024 (CN) ......................... 202411023684.7

(51) Int. Cl.

*G06T 7/00* (2017.01)
*G06T 5/20* (2006.01)
*G06T 7/90* (2017.01)

(52) U.S. Cl.

CPC .............. *G06T 7/0012* (2013.01); *G06T 5/20* (2013.01); *G06T 7/90* (2017.01);

(Continued)

(58) Field of Classification Search

CPC ........... G06T 7/0012; G06T 5/20; G06T 7/90; G06T 2207/10036; G06T 2207/10148;

(Continued)

(56) References Cited

U.S. PATENT DOCUMENTS 11,826,124 B2 * 11/2023 Fei ........................ A61B 5/0075
2006/0115158 A1 * 6/2006 Sunshine .............. G06T 7/0004
382/191

(Continued)

FOREIGN PATENT DOCUMENTS

CN 111652252 A 9/2020
CN 116309139 A 6/2023

(Continued)

OTHER PUBLICATIONS

McCleary, Brent, "Cross-talk correction methodology for color CMOS imagers," Proceedings of SPIE-IS&T Electronic Imaging, 2005, vol. 5678, pp. 117-128.

(Continued)

*Primary Examiner* — Nathan J Flynn
*Assistant Examiner* — Christine A Kurien
(74) *Attorney, Agent, or Firm* — Oliff PLC

(57) ABSTRACT

A general-purpose crosstalk correction method for mosaic multispectral imaging crop growth sensing devices, including: obtaining uniform light source images in different bands in a stepped manner using the sensing device in combination with a tunable monochromatic light source system; searching for uniform light source images in the corresponding bands, and traversing and recording indices of pixels with maximum response values in macro-pixel areas of the images in the bands; and extracting, according to the indices of the pixels, response values of positions of the pixels corresponding to the images in the stepped bands, and drawing response average value curves of channels; and (Continued)

drawing a Gaussian response curve according to response value curves of the channels, multiplying a pseudoinverse matrix of data of the response values by a Gaussian data matrix to obtain a correction coefficient matrix, and eliminating data crosstalk between the bands of raw spectral images using the matrix.

3 Claims, 4 Drawing Sheets

(52) U.S. Cl.
CPC ............... *G06T 2207/10036* (2013.01); *G06T 2207/10148* (2013.01); *G06T 2207/30188* (2013.01)

(58) Field of Classification Search
CPC ........ G06T 2207/30188; G06T 3/4015; Y02A 40/10; G01N 21/31; G01N 21/01; G01N 21/274; G01N 2021/0112; G06F 17/16
See application file for complete search history.

(56) References Cited

U.S. PATENT DOCUMENTS

2011/0058072 A1* 3/2011 Wang ................... H04N 17/002
348/E5.079
2017/0041553 A1* 2/2017 Cao ........................ H04N 5/265
2019/0213727 A1* 7/2019 Nefian ...................... G06T 5/20
2019/0258899 A1* 8/2019 Coogan ................ G06V 20/188
2020/0375521 A1* 12/2020 Hadoux ................... A61B 3/10
2020/0402211 A1* 12/2020 Wang ............... A61B 1/000095
2021/0140821 A1* 5/2021 Kuri ...................... G06V 10/143
2022/0095998 A1* 3/2022 Gareau ................ A61B 5/0075
2022/0343645 A1* 10/2022 Jacob ......................... G06T 7/90
2023/0368379 A1* 11/2023 Liao ...................... G06T 7/0012
2024/0069307 A1* 2/2024 Gregoire .................. G02B 7/38

FOREIGN PATENT DOCUMENTS

CN 117074318 A 11/2023
CN 117278869 A 12/2023
CN 118032672 A 5/2024
WO 2020/213419 A1 10/2020

OTHER PUBLICATIONS

Yang, Wenming, “Research of Real-time Color Digital Holography Acquisition and Application to Detection,” Dissertation, Kunming University of Science and Technology, May 2015, pp. 1-71.

* cited by examiner

GENERAL-PURPOSE CROSSTALK CORRECTION METHOD FOR MOSAIC MULTISPECTRAL IMAGING CROP GROWTH SENSING DEVICES

TECHNICAL FIELD

The present invention relates to the field of smart agriculture, and in particular, to a general-purpose crosstalk correction method for mosaic multispectral imaging crop growth sensing devices.

BACKGROUND

As a critical technical component in smart agriculture, the accurate sensing of crop growth status information can promote quantitative and intelligent agricultural production management. Spectral imaging technology, capitalizing on its technical advantage of image and spectrum integration, offers a technical approach for the real-time, accurate, and non-destructive acquisition of crop growth status information. A multispectral imaging sensor provides a reliable foundational tool for implementing the spectral imaging technology. A conventional multispectral imaging crop growth sensor usually uses a plurality of groups of narrow-band interference filters for spectroscopic imaging, and is easy to assemble. However, as the number of bands increases, the opto-mechanical structure of such a device becomes more complex, making registration and fusion of images in different bands more difficult, and in addition, the real-time processing capability for image and spectrum information is constrained, affecting the real-time performance and efficiency of crop growth monitoring.

In mosaic spectral imaging spectroscopic technology, a plurality of bands can be integrated on a same chip-level coated filter. Crop image and spectrum information in a plurality of bands can be obtained in a snapshot manner through a single exposure. The method enhances the real-time performance of crop image and spectrum information processing, and also promotes the miniaturization and integration of sensing devices. However, because a mosaic filter needs to be installed on the surface of a detector, an integration spacing inevitably exists between the mosaic filter and the detector. As a result, information in different bands enters adjacent or other channel areas, causing information crosstalk between the different bands. Therefore, the correction of crosstalk information using an appropriate method is crucial for ensuring the precision of spectral data. Patent Application No. CN202310860144.3 discloses a crosstalk removal method for snapshot-mosaic multispectral imaging crop growth sensing devices. However, this method performs down sampling only in a case that channels of a mosaic filter and a detector are perfectly aligned, and fails to take other complex cases into consideration. In addition, only a simple least squares method is used in the method to obtain a crosstalk correction coefficient matrix, and a case in which a response value matrix is non-square is not adequately considered. Therefore, there is an urgent need for a general-purpose crosstalk correction method for mosaic multispectral imaging crop growth sensing devices, to solve the problem of information crosstalk between different bands, thereby improving the precision of spectral data and ensuring the accuracy and efficiency of crop growth monitoring.

SUMMARY

An objective of the present invention is to overcome deficiencies in the BACKGROUND, and provide a general-purpose crosstalk correction method for mosaic multispectral imaging crop growth sensing devices, which can correct crosstalk information between different bands accurately in real time.

To achieve the foregoing objective, the technical solutions adopted in the present invention are as follows: S1: obtaining uniform light source images in different bands in a stepped manner by using the mosaic multispectral imaging crop growth sensing devices in combination with a tunable monochromatic light source system; S2: searching for, according to setting of bands on a mosaic filter, uniform light source images in the corresponding bands, and traversing and recording indices of pixels with maximum response values in macro-pixel areas of the images in the bands; determining, according to the indices, positions of the bands on the mosaic filter; and extracting, according to the indices of the pixels, response values of the positions of the pixels corresponding to the uniform light source images in the bands after stepped spectroscopy of the tunable monochromatic light source system, and drawing response value curves of channels; and S3: drawing a corresponding Gaussian response curve according to the response value curves of the channels, multiplying a pseudoinverse matrix of the data of the response values by a Gaussian data matrix to obtain a correction coefficient matrix, and eliminating data crosstalk between the bands of raw spectral images by using the matrix. The present invention effectively solves the problem of spectral information crosstalk caused by an integration spacing between a mosaic filter and a detector, and has characteristics such as generality and simplicity.

Further, S1 includes:

S11: fastening the mosaic multispectral imaging crop growth sensing devices at a light output end of an integrating sphere of the tunable monochromatic light source system, making an imaging objective lens of the sensing device aligned with and parallel to a central aperture of the integrating sphere, and ensuring that a field of view of the imaging objective lens completely covers an internal area of the integrating sphere;

S12: connecting a computer to the mosaic multispectral imaging crop growth sensing devices and the tunable monochromatic light source system, setting an exposure time and a gain value of the mosaic multispectral imaging crop growth sensing devices to 100 ms and 6 dB respectively, adjusting the tunable monochromatic light source system according to the bands on the mosaic filter, and finding out a band with the highest grayscale value on the mosaic filter; and under a condition of the band with the highest grayscale value, adjusting a grayscale value of the mosaic multispectral imaging crop growth sensing devices to 800 to 1000, and setting the exposure time and the gain value in this case as reference values;

S13: adjusting a band of the tunable monochromatic light source system by using the computer, first setting a minimum band value of the tunable monochromatic light source system to be lower than a minimum band value of the mosaic filter, setting a maximum band value of the tunable monochromatic light source system to be higher than a maximum band value of the mosaic filter, and then performing stepped adjustment of the band of the tunable monochromatic light source system in 2 nm intervals between the minimum and maximum band values; and

S14: controlling the mosaic multispectral imaging crop growth sensing devices through the computer, and acquiring a uniform light source image in each band transmitted into the integrating sphere after stepped spectroscopy of the band of the tunable monochromatic light source system.

Further, S2 includes:

S21: searching for, according to the setting of the bands on the mosaic filter, images in the corresponding bands in the acquired uniform light source images in the different bands; determining, according to sizes of the channels in the mosaic filter in the mosaic multispectral imaging crop growth sensing devices, macro-pixel areas of the channels and a distribution pattern of the macro-pixel areas; and traversing and recording indices of pixels with the highest response value in all the macro-pixel areas, to determine the positions of the pixels corresponding to the bands on the mosaic filter; and

S22: extracting, according to the determined pixel position of each band, response values of the positions in all stepping images, calculating a response average value on each stepping image, drawing response value curves of the channels, and forming a matrix D, i.e., a raw matrix, from data of the response values.

Further, S3 includes:

S31: drawing, according to the raw response value curves of the channels in step S22, Gaussian curves corresponding to the channels, and denoting a Gaussian data matrix of the channels as $D_{ideal}$, i.e., a target matrix;

S32: multiplying a pseudoinverse matrix $D^+$ of the raw matrix D in step S22 by the target matrix $D_{ideal}$ in step S31 to obtain a crosstalk correction coefficient matrix T, to minimize a Euclidean norm of an error between a target value and a raw value, i.e.:

$$\underset{T}{\arg\min}\, \|X_{ideal} - XT\|_2^2,$$

where X and $X_{ideal}$ respectively denote an actually measured response data matrix and an ideal response data matrix; and

S33: correcting crosstalk information in all raw spectral images through the crosstalk correction coefficient matrix T in step S32, where a correction formula used is as follows:

$$P_i = \sum_{j=1}^{n} T_{ij} \cdot PX_j,$$

where $P_i$ denotes a reflectance value matrix after correction of an $i^{th}$ band, $T_{ij}$ denotes a correction coefficient at a position in a $j^{th}$ row and an $i^{th}$ column in the correction coefficient matrix T, $PX_j$ denotes a raw reflectance value matrix of a $j^{th}$ band of a to-be-corrected raw spectral image, and n denotes a quantity of the bands.

Further, each of the mosaic multispectral imaging crop growth sensing devices includes: an imaging objective lens, a first mosaic multispectral camera, a second mosaic multispectral camera, a front fastening device, a main control system fixing adjustment piece, a main control system, and a housing, where the main control system fixing adjustment piece fastens the main control system at a rear end of the; the front fastening device sequentially fastens the imaging objective lens, the first mosaic multispectral camera, and the second mosaic multispectral camera at a front end of the housing, light passes through the imaging objective lens to be sequentially received by the first mosaic multispectral camera and the second mosaic multispectral camera, and the first mosaic multispectral camera and the second mosaic multispectral camera are connected to the main control system to send data to the main control system; and the main control system performs real-time online processing and interpretation on received image and spectrum information.

The beneficial effects of the present invention are as follows: The mosaic multispectral imaging crop growth sensing devices obtain uniform light source images in different bands, and ensure light uniformity in the images in the different bands; determine positions of channels according to pixel response characteristics in macro-pixels and a distribution pattern of the macro-pixels, and specify a down sampling manner of the images, thereby ensuring the accuracy of extracting response values of images in the channels; use response data of the channels as a raw matrix, use Gaussian curve data as a target matrix, and multiply a pseudoinverse matrix of the raw matrix by the target matrix to obtain a crosstalk correction coefficient matrix, thereby ensuring the minimization of a Euclidean norm of an error between a target value and a raw value; and implement real-time online correction of crosstalk information in raw images through the crosstalk correction coefficient matrix, thereby effectively solving the problem of interference of crosstalk information between different bands on the precision of spectral data.

Figure 1:
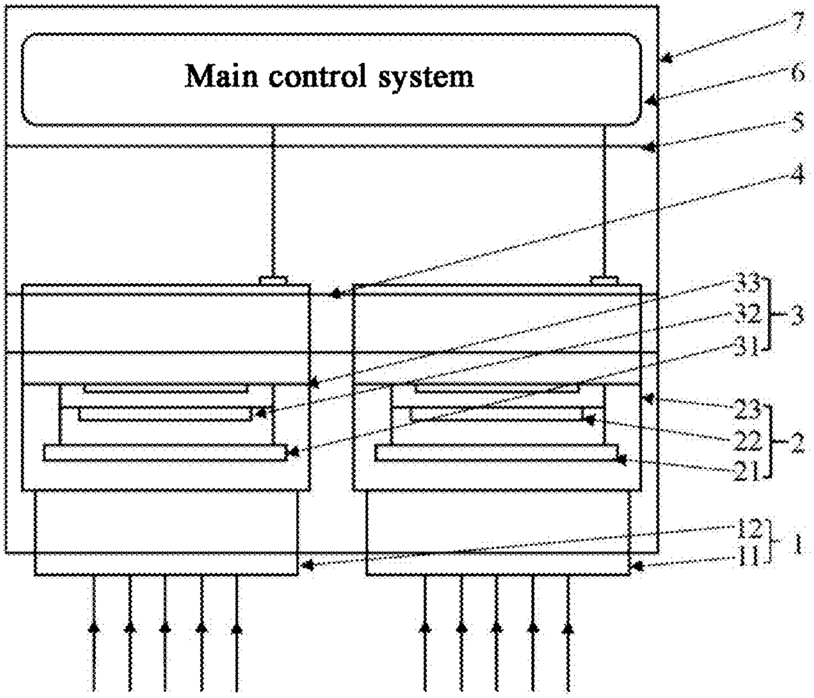
FIG. 1 is a schematic structural diagram of a mosaic multispectral imaging crop growth sensing device according to the present invention.

Reference numerals: 1—imaging objective lens, 11—first imaging objective lens, 12—second imaging objective lens, 2—first mosaic multispectral camera, 21—first protective glass, 22—first mosaic filter, 23—first CMOS image sensor, 3—second mosaic multispectral camera, 31—second protective glass, 32—second mosaic filter, 33—second CMOS image sensor, 4—front fastening device, 5—main control system fixing adjustment piece, 6—main control system, and 7—housing.

DETAILED DESCRIPTION

The present invention is described below in detail with reference to the accompanying drawings and specific embodiments.

Figure 2A:
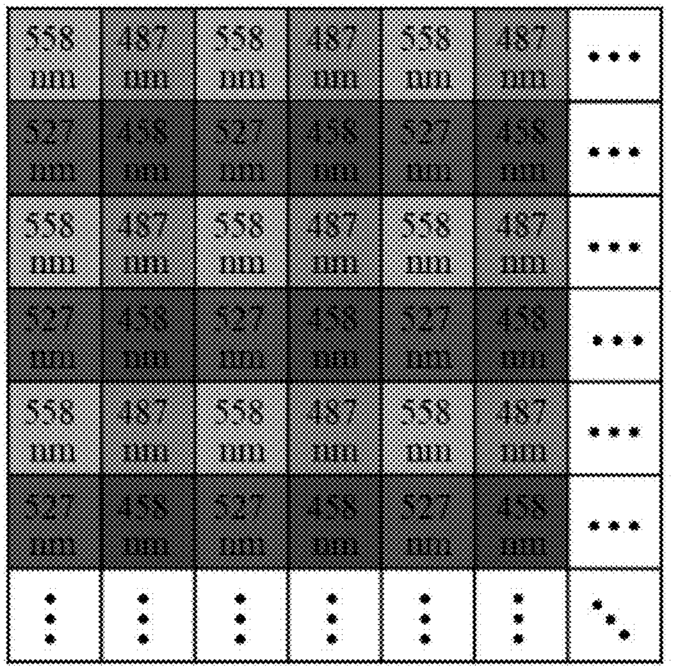
FIG. 2*a* is a schematic diagram corresponding to bands on a mosaic filter of a first mosaic multispectral camera according to the present invention.
Figure 2B:
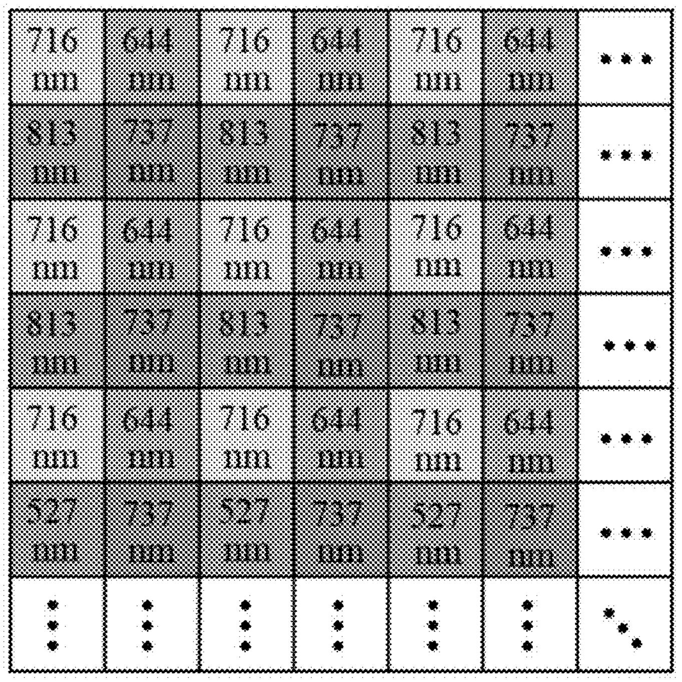
FIG. 2*b* is a schematic diagram corresponding to bands on a mosaic filter of a second mosaic multispectral camera according to the present invention.

As shown in FIG. 1 and FIG. 2, a mosaic multispectral imaging crop growth sensing device includes a first imaging objective lens, a first mosaic multispectral camera 2, a second mosaic multispectral camera 3, a front fastening device 4, a main control system fixing adjustment piece 5, a main control system 6, and a housing 7 (in a preferred embodiment, the first imaging objective lens uses Computar V2520-MPZ lens manufactured by CBC Co., Ltd., Japan). The main control system 6 is built using embedded AI modules NVIDIA Jetson TX2, which belong to existing technology. For the mosaic multispectral cameras, refer to the applicant's earlier application No. 2024101689797. Compared with the mosaic multispectral camera in the earlier application, a group of mosaic multispectral cameras with other central bands are added in this example, to enhance the reliability of the method provided in this patent. A first mosaic filter 22 and a second mosaic filter 32 are respectively disposed on the surfaces of a first CMOS image sensor 23 and a second CMOS image sensor 32. Next, specific implementations are described by using the first mosaic multispectral camera 2 with bands of 458, 487, 527, and 558 nm being central bands and the second mosaic multispectral camera 3 with bands of 644, 716, 737, and 813 nm being central bands as an example.

In the present invention, to ensure that images in bands obtained by the mosaic multispectral imaging crop growth sensing device are uniform light source images. A tunable monochromatic light source system manufactured by Beijing Zolix Instruments Co., Ltd. is used. The system includes a broad-spectrum light source with a spectral coverage of 350 nm to 2500 nm, a spectrometer with a spectral range of 350 nm to 1100 nm, and an integrating sphere with an inner diameter and an exit aperture being respectively 200 mm and 50 mm and uniformity greater than 98%. The mosaic multispectral imaging crop growth sensing device is used to obtain uniform spectral images in different bands.

Figure 3:
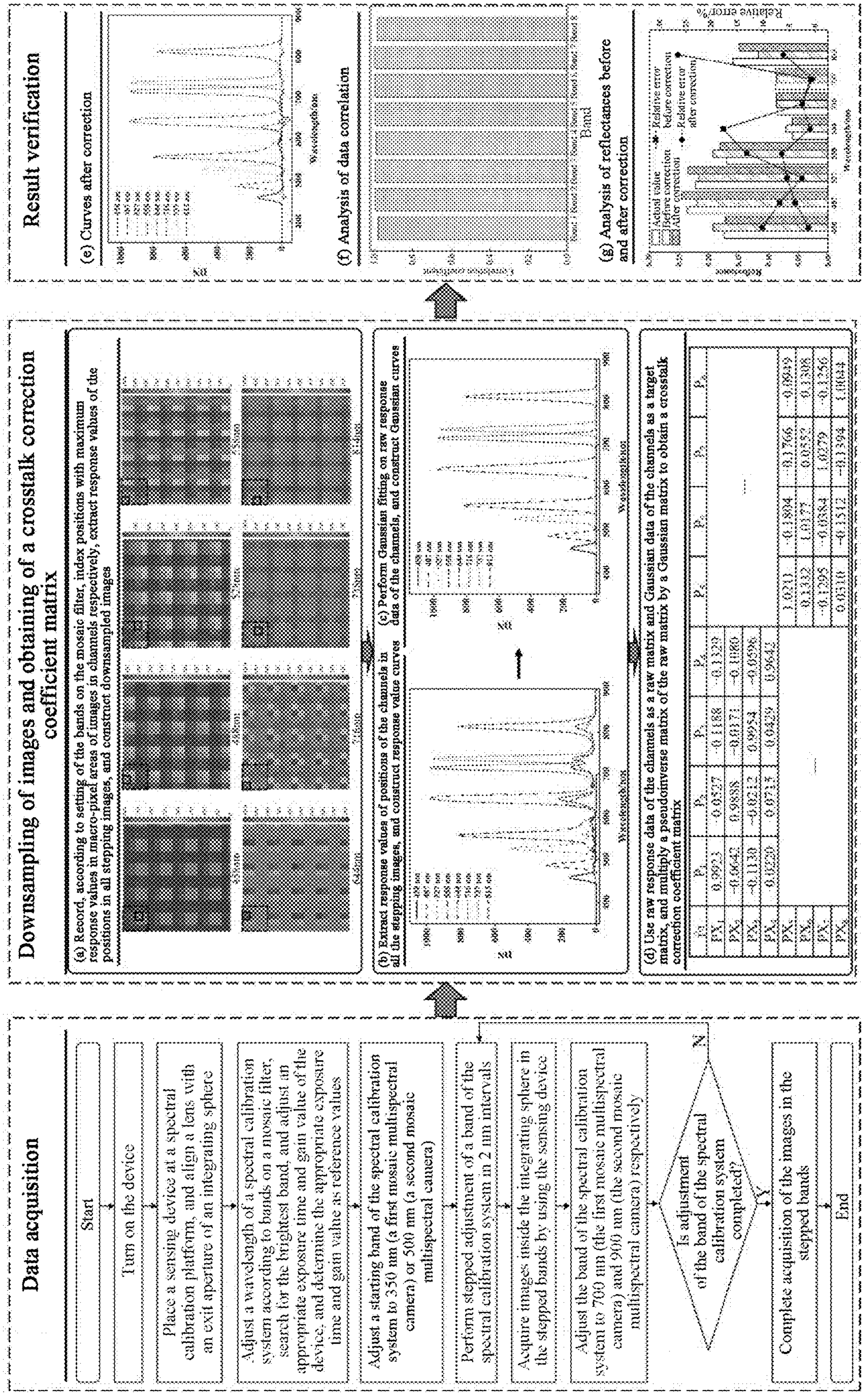
FIG. 3 is a schematic flowchart of a spectral crosstalk removal method for mosaic multispectral imaging crop growth sensing devices according to the present invention.

As shown in FIG. 3, a general-purpose crosstalk correction method for mosaic multispectral imaging crop growth sensing devices, including the following procedure steps:

Step S1: Control the mosaic multispectral imaging crop growth sensing devices by using a computer to obtain uniform light source images in different bands. Step S1 specifically includes the following three substeps.

S11: Fasten the mosaic multispectral imaging crop growth sensing devices at a light output end of an integrating sphere of a tunable monochromatic light source system, make an imaging objective lens of the sensing device aligned with and parallel to a central aperture of the integrating sphere, and ensure that a field of view of the imaging objective lens completely covers an internal area of the integrating sphere.

Step S12: Connect the computer to the mosaic multispectral imaging crop growth sensing devices and the tunable monochromatic light source system, first adjust an exposure time and a gain value of the first mosaic multispectral camera 2 to 100 ms and 6 dB respectively through the computer, and adjust a band of a spectrometer of the tunable monochromatic light source system to 458, 487, 527, and 558 nm respectively, where at setting of a band of 558 nm, a grayscale value of an image is a maximum value, then at 558 nm, a grayscale value of the first mosaic multispectral camera 2 is adjusted to 880 to 920, and an exposure time of 950 ms and a gain value of 4 dB in this case are used as reference values of the first mosaic multispectral camera 2; and then adjust the band of the spectrometer of the tunable monochromatic light source system to 644, 716, 737, and 813 nm respectively, where at setting of a band of 813 nm, a grayscale value of an image is a maximum value, then at 813 nm, a grayscale value of the second mosaic multispectral camera 3 is adjusted to 880 to 920, and an exposure time of 850 ms and a gain value of 2.5 dB in this case are used as reference values of the second mosaic multispectral camera 3.

Step S13: Align the first imaging objective lens 11 of the first mosaic multispectral camera 2 with the interior of the integrating sphere, adjust the band of the spectrometer of the tunable monochromatic light source system to 350 nm through the computer, step a value of the band of the spectrometer of the tunable monochromatic light source system in 2 nm intervals, where a range of stepped adjustment is 350 nm to 700 nm, and during stepped adjustment each time, control the first mosaic multispectral camera 2 to acquire an image in each band; and align the second imaging objective lens 12 of the second mosaic multispectral camera 3 with the interior of the integrating sphere, adjust the band of the spectrometer of the tunable monochromatic light source system to 500 nm through the computer, step the value of the band of the spectrometer of the tunable monochromatic light source system in 2 nm intervals, where the range of stepped adjustment is 500 nm to 900 nm, and during stepped adjustment each time, control the second mosaic multispectral camera 3 to acquire an image in each band.

Step S2: Search for, according to setting of bands on a mosaic filter, uniform light source images in the corresponding bands, and traverse and record indices of pixels with maximum response values in macro-pixel areas of the images in the bands; and extract, according to the indices of the pixels, response values of positions of the pixels corresponding to the images in the stepped bands, and draw response average value curves of channels. Step S2 specifically includes the following two substeps.

S21: Search for, according to setting (as shown in FIG. 2) of the bands (458, 487, 527, 558, 644, 716, 737, and 813 nm) of the first mosaic multispectral camera 2 and the second mosaic multispectral camera 3, images in the corresponding bands in the acquired stepping images; determine, according to sizes of channels of the first mosaic filter 22 and the second mosaic filter 32 being 11×11 μm, macro-pixel areas of the channels; fully distribute the macro-pixel areas on an entire imaging target surface with a pattern of 2-pixel intervals (as shown in FIG. 3(*a*)); and traverse and record indices of pixels with the highest response value in all the macro-pixel areas by using MATLAB software, to determine the positions of the pixels corresponding to the bands on the first mosaic multispectral camera 2 and the second mosaic multispectral camera 3.

S22: Extract, according to the pixel position of each band determined in step S21, response values of the positions in each stepping image by using the MATLAB software, calculate a response average value on each image, draw the response average value curves (as shown in FIG. 3(*b*)) of the channels, and form a matrix D, i.e., a raw matrix, from data of the response values.

Step S3: Draw a Gaussian response curve according to response value curves of the channels, multiply a pseudo-inverse matrix of data of the response values by a Gaussian data matrix to obtain a correction coefficient matrix, and eliminate data crosstalk between the bands of raw spectral images by using the matrix. Step S3 specifically includes the following four substeps.

S31: Draw, according to the raw response value curves of the channels in step S22, Gaussian curves (as shown in FIG. 3(*c*)) corresponding to the channels by using the MATLAB software, and denote a Gaussian data matrix of the channels as $D_{ideal}$, i.e., a target matrix.

S32: Multiply a pseudoinverse matrix $D^+$ of the raw matrix D in step S22 by the target matrix $D_{ideal}$ in step S31 to solve a crosstalk correction coefficient matrix T (as shown in FIG. 3(*d*)), to minimize a Euclidean norm of an error between a target value and a raw value, i.e.:

$$\underset{T}{\arg\min} \|X_{ideal} - XT\|_2^2,$$

where X and $X_{ideal}$ respectively denote an actually measured (containing crosstalk) response data matrix and an ideal response data matrix.

S33: Correct the raw response value matrix D by using the crosstalk correction coefficient matrix T to obtain response curves of the channels, as shown in FIG. 3(*e*).

In the present invention, the provided general-purpose crosstalk correction method for mosaic multispectral imaging crop growth sensing devices is verified in two manners: A first verification manner is implemented by using a correlation result of a data matrix of the Gaussian curves (as shown in FIG. 3(*c*)) constructed in step S31 and a data matrix of the curves (as shown in FIG. 3(*e*)) of the channels after crosstalk correction obtained in step S33.

Figure 4:
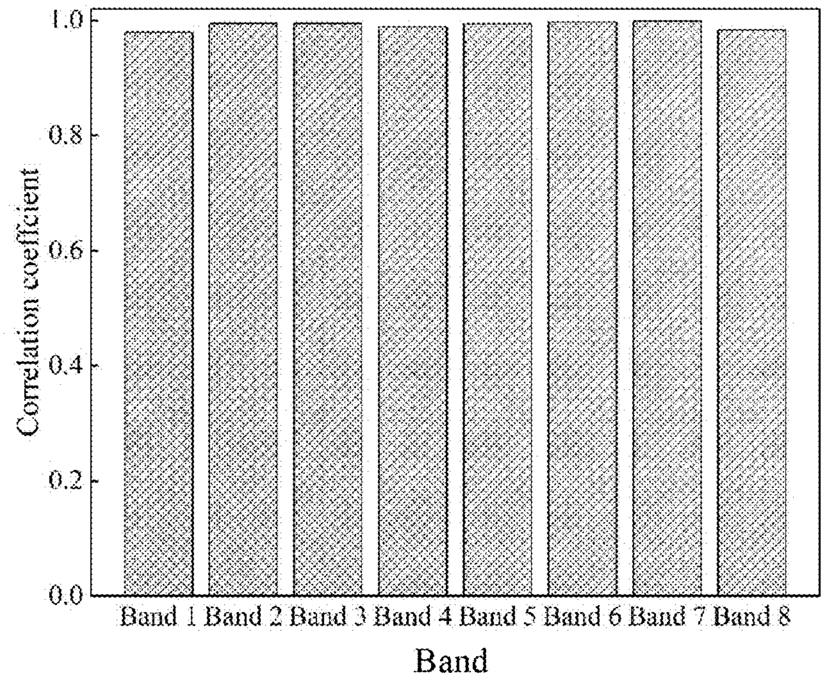
FIG. 4 is a correlation diagram between a data matrix after correction of spectral crosstalk information and a Gaussian data matrix in a mosaic multispectral imaging crop growth sensing device according to the present invention.

In the present invention, as shown in FIG. 4, an implementation effect of the provided general-purpose crosstalk correction method for mosaic multispectral imaging crop growth sensing devices is shown in FIG. 4. FIG. 4 shows a result of Pearson correlation analysis of the data matrix of the Gaussian curves of the channels and the corrected data matrix, and correlation coefficients of eight channels are respectively 0.979, 0.995, 0.995, 0.989, 0.994, 0.997, 0.998, and 0.983. The result shows that the data matrix obtained by correcting raw data by using the crosstalk correction coefficient matrix has very good correlation with the target matrix, proving that the provided correct crosstalk method has a very good effect.

A second verification method is implemented by using a green diffuse reflection calibration plate with a reflectance of 20% to 30% manufactured by Guangzhou Changhui Electronic Technology Co., Ltd. Digital quantization values of images obtained by the mosaic multispectral imaging crop growth sensing devices are converted into reflectance values through radiometric correction. A used standard calibration panel is a gray calibration panel with a reflectance of 40%. A used calculation formula is as follows:

$$\rho_c = \frac{DN_c - DN_b}{DN_w - DN_b} \times \rho_w,$$

where $DN_c$ denotes a pixel response value of a to-be-tested green diffuse reflection calibration plate, $DN_w$ denotes an obtained pixel response value of the gray calibration panel, DNB denotes dark frame pixel response values (obtained by shooting an image with a lens cap closed), and $\rho_w$ denotes that a reflectance value of the gray calibration panel is 0.4.

S34: Eliminate obtained raw digital quantization values of the green diffuse reflection calibration plate by using the crosstalk correction coefficient matrix T. A correction formula used is as follows:

$$P_i = \sum_{j=1}^{n} T_{ij} \cdot PX_j,$$

where $P_i$ denotes a reflectance value matrix after correction of an $i^{th}$ band, $T_{ji}$ denotes a correction coefficient at a position in a $j^{th}$ row and an $i^{th}$ column in the correction coefficient matrix T, $PX_j$ denotes a raw reflectance value matrix of a $j^{th}$ band of a to-be-corrected raw spectral image, and n denotes a quantity of the bands.

Figure 5:
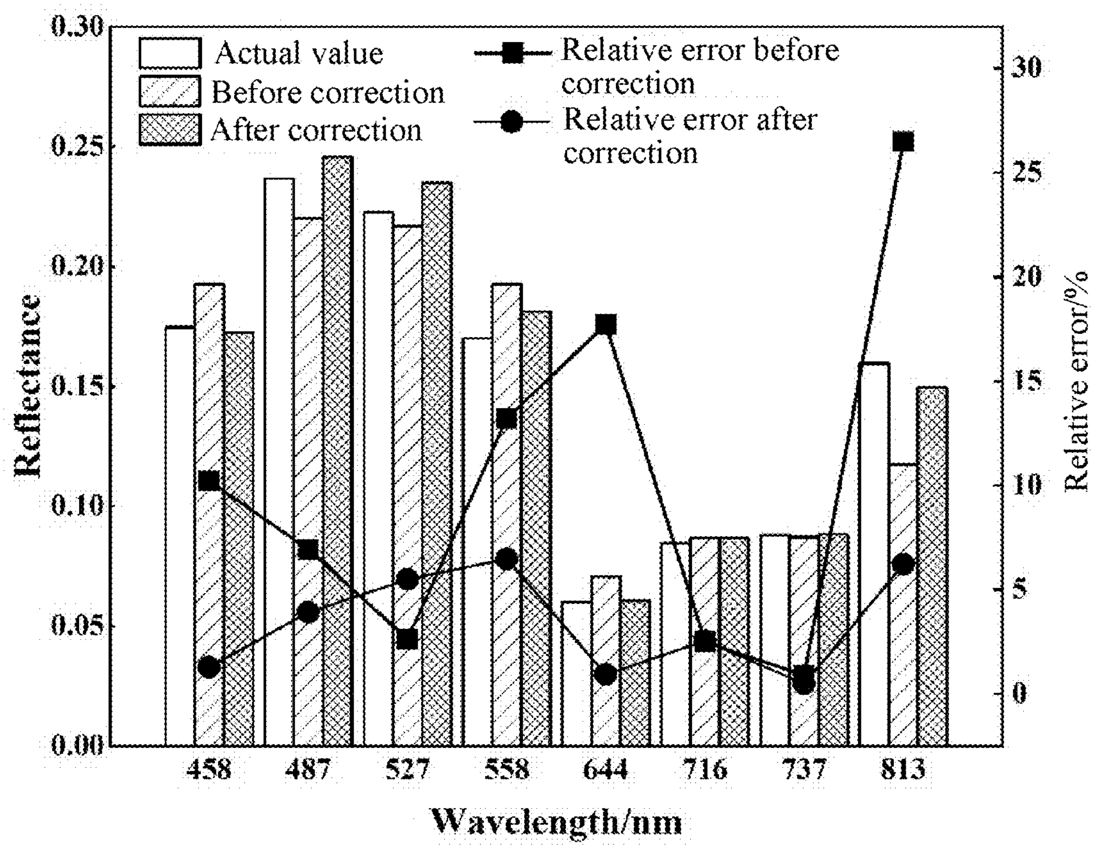
FIG. 5 is a statistical chart of reflectances of a diffuse reflection plate before and after spectral crosstalk information is removed in a mosaic multispectral imaging crop growth sensing device according to the present invention.

In the present invention, an implementation effect of the provided general-purpose crosstalk correction method for mosaic multispectral imaging crop growth sensing devices is shown in FIG. 5. FIG. 5 is a chart of effects before and after correction of a reflectance value of the green diffuse reflection calibration plate acquired by the mosaic multispectral imaging crop growth sensing devices. As shown in FIG. 5, before data correction using the crosstalk correction coefficient matrix T, an actually measured reflectance value of the green diffuse reflection calibration plate has a large difference from an actual value, with a maximum relative error and an average relative error being respectively 26.49% and 10.07%. After data correction using the crosstalk correction coefficient matrix T, crosstalk information between bands is corrected adequately, and the maximum relative error and the average relative error are respectively reduced to 4.85% and 1.74%. The result shows that the provided general-purpose crosstalk correction method for mosaic multispectral imaging crop growth sensing devices is completely applicable to actually-measured data, thereby improving the precision of crop growth monitoring.

The above shows and describes the basic principles of the present invention, main features, and advantages. It should be understood by a person of ordinary skill in the art that the foregoing embodiments do not limit the scope of protection of the present invention in any form. Any technical solution obtained through an equivalent replacement or the like shall fall within the scope of protection of the present invention.

All parts that are not involved in the present invention are the same as existing technology or can be implemented using existing technology.

What is claimed is:

1. A general-purpose crosstalk correction method for mosaic multispectral imaging crop growth sensing devices, comprising the following steps:

S1: obtaining uniform light source images in different bands in a stepped manner by using the mosaic multispectral imaging crop growth sensing devices in combination with a tunable monochromatic light source system;

S2: searching for, according to setting of bands on a mosaic filter, uniform light source images in the corresponding bands, and traversing and recording indices of pixels with maximum response values in macro-pixel areas of the images in the bands; determining, according to the indices, positions of the pixels corresponding to the bands on the mosaic filter; and extracting, according to the indices of the pixels, response values of the positions of the pixels corresponding to the uniform light source images in the bands after stepped spectroscopy of the tunable monochromatic light source system, and drawing response average value curves of channels, wherein S2 comprises:

S21: searching for, according to the setting of the bands on the mosaic filter, images in the corresponding bands in the acquired uniform light source images in the different bands;

determining, according to sizes of the channels in the mosaic filter in the mosaic multispectral imaging crop growth sensing devices, macro-pixel areas of the channels and a distribution pattern of the macro-pixel areas;

and traversing and recording indices of pixels with the highest response value in all the macro-pixel areas, to determine the positions of the pixels corresponding to the bands on the mosaic filter; and

S22: extracting, according to the determined pixel position of each band, response values of the positions in all stepping images, calculating a response average value on each stepping image, drawing response value curves of the channels, and forming a matrix D, i.e., a raw matrix, from data of the response values; and

S3: drawing a corresponding Gaussian response curve according to the response value curves of the channels, multiplying a pseudoinverse matrix of the data of the response values by a Gaussian data matrix to obtain a crosstalk correction coefficient matrix, and eliminating data crosstalk between the bands of raw spectral images by using the matrix, wherein S3 comprises:

S31: drawing, according to the raw response value curves of the channels in the step S22, Gaussian curves corresponding to the channels, and denoting a Gaussian data matrix of the channels as $D_{ideal}$, i.e., a target matrix;

S32: multiplying a pseudoinverse matrix $D^+$ of the raw matrix D in the step S22 by the target matrix $D_{ideal}$ in the step S31 to obtain a crosstalk correction coefficient matrix T, to minimize a Euclidean norm of an error between a target value and a raw value, i.e.:

$$\underset{T}{\arg\min} \|X_{ideal} - XT\|_2^2,$$

Wherein X and $X_{ideal}$ respectively denote an actually measured response data matrix and an ideal response data matrix; and

S33: correcting crosstalk information in all raw spectral images through the crosstalk correction coefficient matrix T in the step S32, wherein a correction formula used is as follows:

$$P_i = \sum_{j=1}^{n} T_{ij} \cdot PX_j,$$

Wherein $P_i$ denotes a reflectance value matrix after correction of an $i^{th}$ band, $T_{ij}$ denotes a correction coefficient at a position in a $j^{th}$ row and an $i^{th}$ column in the correction coefficient matrix T, $PX_j$ denotes a raw reflectance value matrix of a $j^{th}$ band of a to-be-corrected raw spectral image, and n denotes a quantity of the bands.

2. The general-purpose crosstalk correction method for mosaic multispectral imaging crop growth sensing devices according to claim 1, wherein S1 comprises:

S11: fastening the mosaic multispectral imaging crop growth sensing devices at a light output end of an integrating sphere of the tunable monochromatic light source system, making an imaging objective lens of the sensing devices aligned with and parallel to a central aperture of the integrating sphere, and ensuring that a field of view of the imaging objective lens completely covers an internal area of the integrating sphere;

S12: connecting a computer to the mosaic multispectral imaging crop growth sensing devices and the tunable monochromatic light source system, setting an exposure time and a gain value of the mosaic multispectral imaging crop growth sensing devices to 100 ms and 6 dB respectively, adjusting the tunable monochromatic light source system according to the bands on the mosaic filter, and finding out a band with the highest grayscale value on the mosaic filter; and under a condition of the band with the highest grayscale value, adjusting a grayscale value of the mosaic multispectral imaging crop growth sensing devices to 800 to 1000, and setting the exposure time and the gain value in this case as reference values;

S13: adjusting a band of the tunable monochromatic light source system by using the computer, first setting a minimum band value of the tunable monochromatic light source system to be lower than a minimum band value of the mosaic filter, setting a maximum band value of the tunable monochromatic light source system to be higher than a maximum band value of the mosaic filter, and then performing stepped adjustment of the band of the tunable monochromatic light source system in 2 nm intervals between the minimum and maximum band values; and

S14: controlling the mosaic multispectral imaging crop growth sensing devices through the computer, and acquiring a uniform light source image in each band transmitted into the integrating sphere after stepped spectroscopy of the band of the tunable monochromatic light source system.

3. The general-purpose crosstalk correction method for mosaic multispectral imaging crop growth sensing devices according to claim 1, wherein each of the mosaic multispectral imaging crop growth sensing devices comprises:

an imaging objective lens, a first mosaic multispectral camera, a second mosaic multispectral camera, a front fastening device, a main control system fixing adjustment piece, a main control system, and a housing, wherein the main control system fixing adjustment piece fastens the main control system at a rear end of the housing; the front fastening device sequentially fastens the imaging objective lens, the first mosaic multispectral camera, and the second mosaic multispectral camera at a front end of the housing, light passes through the imaging objective lens to be sequentially received by the first mosaic multispectral camera and the second mosaic multispectral camera, and the first mosaic multispectral camera and the second mosaic multispectral camera are connected to the main control system to send data to the main control system; and the main control system performs real-time online processing and interpretation on received image and spectrum information.

* * * * *